US008286575B2

(12) United States Patent
Somers

(10) Patent No.: US 8,286,575 B2
(45) Date of Patent: Oct. 16, 2012

(54) FLAGPOLE ARRANGEMENT WITH INTEGRAL COUNTERWEIGHT

(75) Inventor: J. Scott Somers, Addison, TX (US)

(73) Assignee: Concord Industries, Inc., Dallas, TX (US)

( * ) Notice: Subject to any disclaimer, the term of this patent is extended or adjusted under 35 U.S.C. 154(b) by 40 days.

(21) Appl. No.: 12/702,917

(22) Filed: Feb. 9, 2010

(65) Prior Publication Data

US 2011/0192340 A1 Aug. 11, 2011

(51) Int. Cl.
*G01F 17/00* (2006.01)

(52) U.S. Cl. ....................................................... 116/173

(58) Field of Classification Search .......... 116/173–175; 40/601, 602, 606.11; D11/165, 166, 181–183
See application file for complete search history.

(56) References Cited

U.S. PATENT DOCUMENTS

| | | | | |
|---|---|---|---|---|
| 1,680,703 | A * | 8/1928 | Sullivan | 116/173 |
| 2,168,951 | A * | 8/1939 | Caldwell | 137/355.25 |
| 2,440,500 | A * | 4/1948 | Ellis | 116/173 |
| 3,101,491 | A * | 8/1963 | Salo | 441/23 |
| 3,295,665 | A * | 1/1967 | Bitzer | 198/824 |
| 3,418,967 | A * | 12/1968 | Donkersloot | 116/173 |
| 3,595,202 | A * | 7/1971 | Visitacion | 116/174 |
| 3,872,816 | A * | 3/1975 | Cutts | 114/106 |
| 3,976,283 | A * | 8/1976 | Schmit | 254/387 |
| 5,117,859 | A * | 6/1992 | Carlson | 137/355.25 |
| 5,373,287 | A * | 12/1994 | Doublet | 340/12.22 |
| 5,586,517 | A * | 12/1996 | Willis et al. | 116/173 |
| 6,484,992 | B1 * | 11/2002 | Svensson et al. | 248/320 |
| 2007/0006794 | A1 * | 1/2007 | Swenson et al. | 116/173 |

FOREIGN PATENT DOCUMENTS

| | | | |
|---|---|---|---|
| ES | 2020452 | A * | 8/1991 |
| GB | 2335072 | A * | 9/1999 |
| WO | WO 2004113649 | A2 * | 12/2004 |

OTHER PUBLICATIONS

Derwent 2012-E12447 clipped image and abstract of CN 202176146 U, titled “Balance weight rod integrated flagpole has flag post that is equipped with balance weight rod connected with flag”, published Mar. 28, 2012, Inventor: Wang, Y, Assignee: Nantong Xiyun Trading Co Ltd [NANTN].*

* cited by examiner

*Primary Examiner* — R. A. Smith
(74) *Attorney, Agent, or Firm* — Gardere Wynne Sewell LLP

(57) ABSTRACT

A flag arrangement with an integral counterweight for an internal halyard flagpole having a longitudinal axis, the counterweight having a flexible segment and opposed ends with first and second attachment means and a surrounding sheath where the first attachment means is in connection to a halyard having an external end. In some aspects, the first attachment means engages a secondary linkage having a rotatable swivel attached to the halyard external end, wherein the first and second attachment means are in cooperating relationship with a flag attachment means. In another aspect, the first attachment means engages a secondary linkage having a rotatable swivel attached to the halyard external end.

15 Claims, 3 Drawing Sheets

FLAGPOLE ARRANGEMENT WITH INTEGRAL COUNTERWEIGHT

FIELD OF THE INVENTION

The present invention generally relates to halyards for internal flagpoles, and more particularly to counterweights for internal halyard flagpoles.

BACKGROUND

On an internal halyard flagpole, the halyard travels from the winch assembly located inside the flagpole through a pulley assembly and exits the top of the flagpole and ends in an arrangement connected to the displayed flag. Since the end of the flag arrangement does not attach to a cleat assembly, the end of the halyard engages a retainer ring connected to the flagpole shaft that holds the flag in position, and a weight is typically attached to the retainer ring to provide adequate tension on the cable to prevent it from jumping the pulley assembly and becoming tangled. Conventional counterweights are compact, dense and rigid, and pose disadvantages associated with these features including being unsightly, potentially dangerous, and inadequate in exerting sufficient tension on the halyard thereby leading to dislodgement and tangling. Moreover, conventional counterweights are attached at the bottom of a flag arrangement and extend to a ring assembly. As the bottom of the flag tends to rise under windy conditions, the conventional counterweight places stress on the flag and particularly the flag hem parallel and adjacent to the flagpole, thereby increasing the tendency of the flag to fray or tear.

SUMMARY OF THE INVENTION

The present invention provides an improved flag arrangement with an integral counterweight for tensioning an internal halyard cable system and the like. In accordance with another aspect of the present invention a flexible counterweight with surrounding sheath is provided.

Those skilled in the art will further appreciate the above-mentioned of the invention together with other important aspects thereof upon reading the detailed description which follows in conjunction with the drawings.

DETAILED DESCRIPTION

Figure 1:
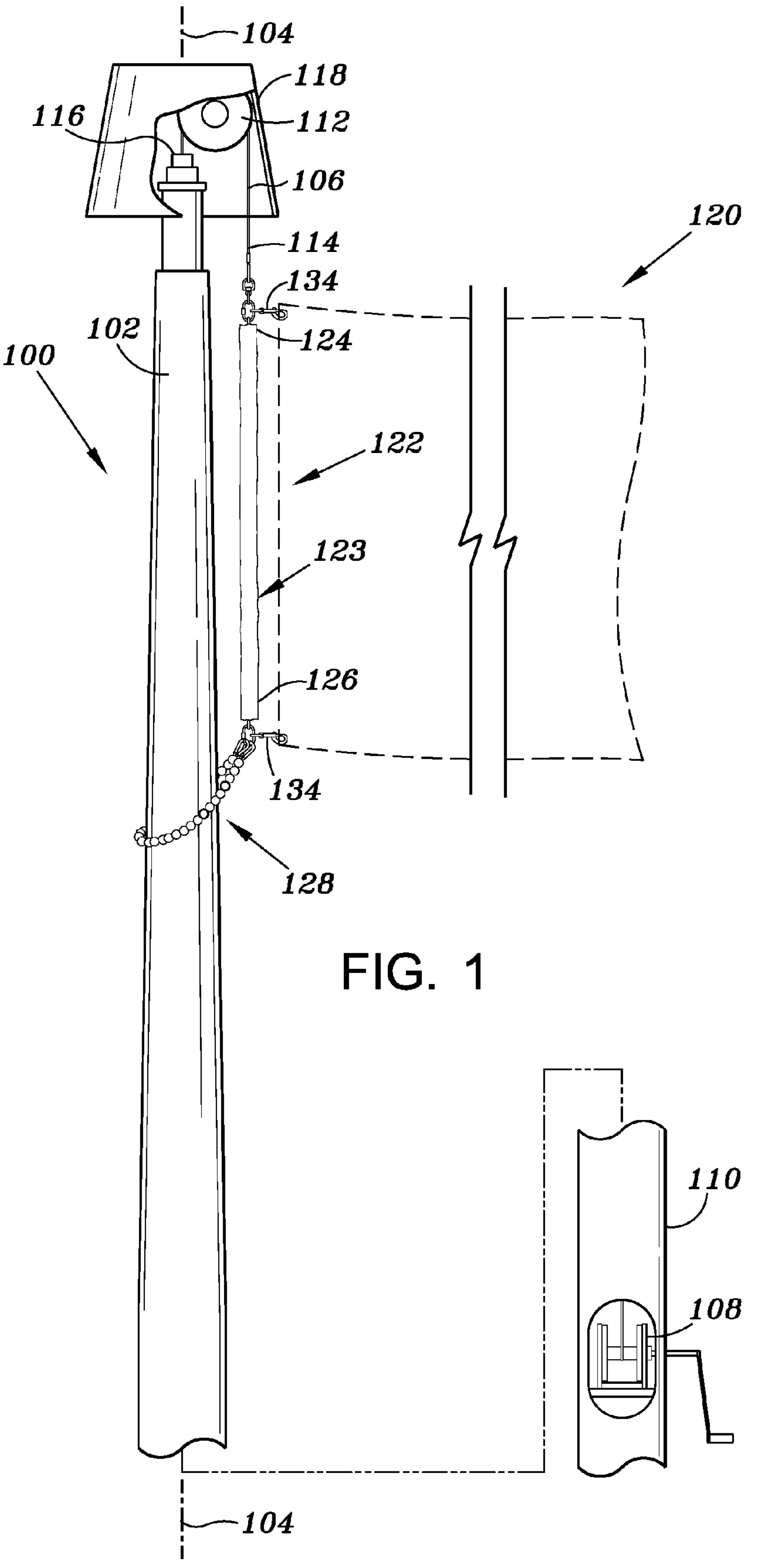
FIG. 1 is an elevation view of an internal halyard flagpole with an external counterweight.

In the description which follows like elements are marked throughout the specification and drawing with the same reference numerals, respectively. The drawings are not necessarily to scale and certain features may be shown in somewhat schematic or generalized form in the interest of clarity and conciseness.

Referring to FIG. 1, flagpole assembly 100 includes a tubular flagpole body 102 having a principal central axis 104, with the assembly mounted vertically to a support (not shown). The tubular flagpole body includes a halyard 106 connected at one or first end to an internal winch 108 typically mounted near the base 110 of the pole and travels via a truck or pulley assembly 112 so that the other or second end 114 of the halyard extends out at or near an opening at the pole tip 116 and is predominantly external to the pole for attachment to a flag assembly 120. Flag assembly 120 is attached to the external halyard 106 so that paying out the halyard lowers the flag as the length of the halyard extending from the exit opening at the pole tip 116 increases. The halyard is retracted by winding halyard 106 onto the internal winch 108.

Figure 2:
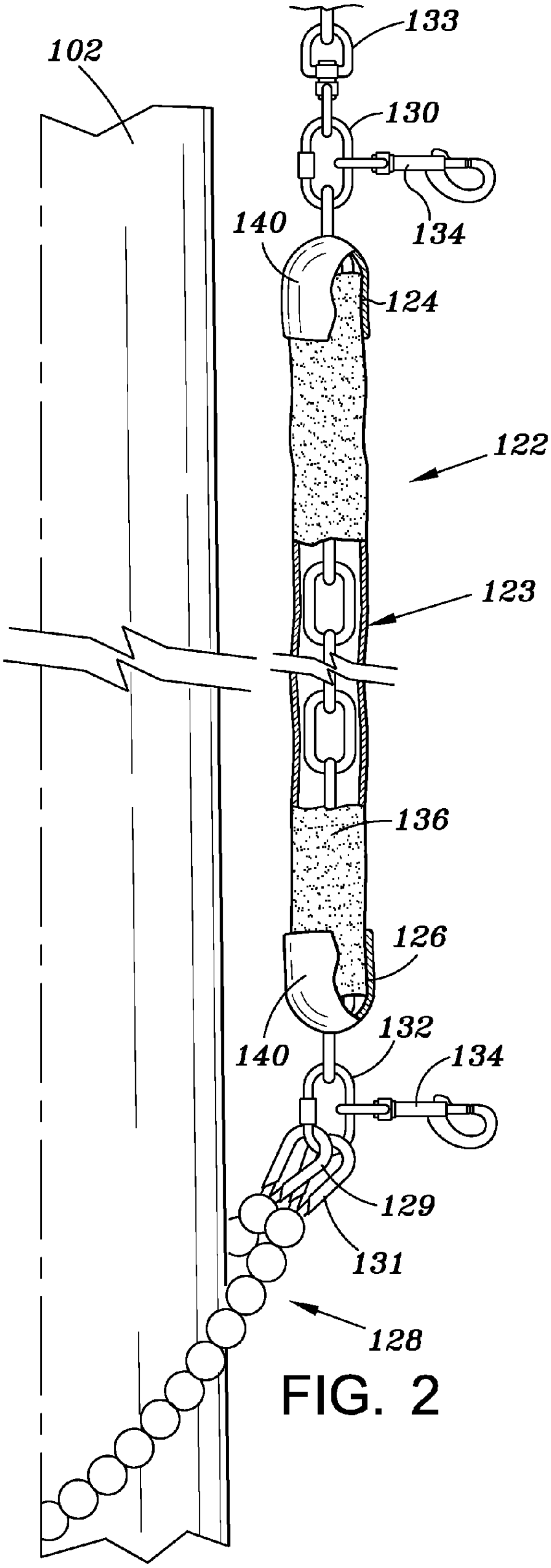
FIG. 2 is a partial elevation view of the external counterweight of FIG. 1 showing greater detail.
Figure 4:
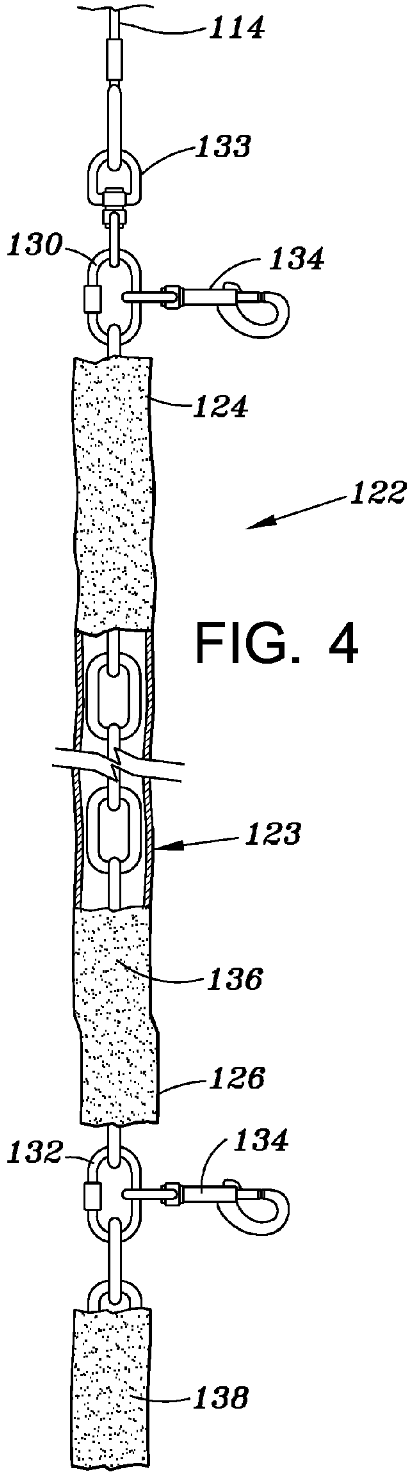
FIG. 4 is an elevation view of the external counterweight of FIG. 1 showing the extension.

Referring to FIGS. 1 and 2, counterweight 122 is connected to or is coextensive with halyard 106 and retention ring assembly 128 and exerts tension on the halyard 106 to maintain its placement upon the truck pulley assembly 112 to avoid "bird nesting" within the tubular flagpole body 102 and to substantially maintain flag assembly 120 unfurled in part by mitigating upward rise of the flag. Furthermore, the flag arrangement cable and counterweight removes the stress and distributes it to the flag arrangement and mitigates the stress on the attached flag.

Counterweight 122 includes a central flexible portion 123 and opposed ends 124, 126 that include attachment means 130, 132 for connection to halyard 106 or the second halyard end 144 and retainer ring assembly 128 encircling flagpole body 102 and having first and second ends forming yokes 129, 131. Attachments means 130, 132 in one aspect may be a chain link or carbiner-type linkage (as shown) for attachment to a secondary linkage 133 of the halyard second end and to yokes 129, 131 of retainer ring assembly 128. The secondary linkage is preferably a swivel to reduce kinking of the halyard, counterweight, or both, and may be longitudinally symmetrical about the swivel although its lower portion is shown in side view in FIG. 3 so attachment means 130 and flag attachment means 134 can be more clearly shown.

Figure 3:
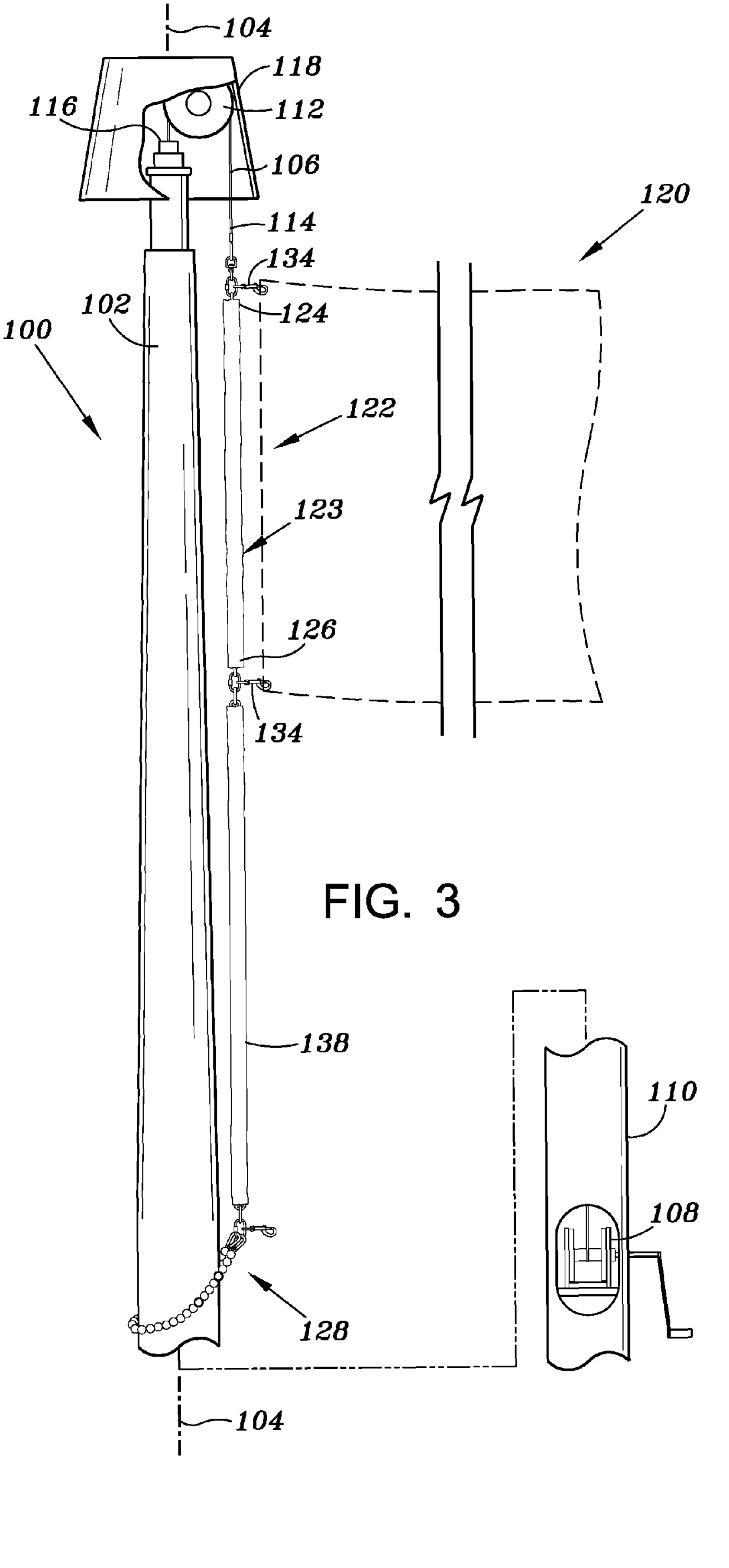
FIG. 3 is an elevation view of the external counterweight of FIG. 4 showing greater detail.

Attachment means 130, 132 include flag attachment means 134, respectively, that include a fastener, and particularly a self-closing fastener such as a clip for flags having fastener receiving holes. Attachment means 130,132 are optionally rotatable as shown in FIGS. 2 and 3. It may also be desirable for particular applications, such as high wind environments, to include a shock spring (not shown) between halyard second end 114 and counterweight end 124. The shock spring may be connected between halyard second end 114 and attachment means 130, or to secondary linkage 133.

Counterweight 122 has a weight-to-length ratio of less than 2, less than 1.5, less than 1, or less than 0.5, and is between about 0.25 to about 3 pounds per linear foot, and in one aspect, the counterweight is about 1 pound per linear foot. Thanks to its weight-to-length ratio, counterweight 122 provides improved weight distribution and tension throughout the area of attachment of the counterweight to the flag. Central flexible portion 123 is understood to be substantially yielding and collapsible throughout at least 50% of its length although it may include multiple rigid segments in adjacent relation, as shown, or nonadjacent relationship. For instance, counterweight 122, in one aspect of the invention, is metallic and made of one-quarter to three-eighths inch chain link that is preferably steel or aluminum, and more preferably galvanized steel. In another aspect, counterweight 122 is comprised of alternating or semi-alternating rigid and flexible portions and the rigid portions or segments may be metallic and as described above, and the flexible portions may be comprised of a flexible polymer. The rigid and flexible portions may have similar or differing densities but the overall density of counterweight 122 meets a weight-to-length description above.

The counterweight may be partially or completely coated with a composition comprising a natural or synthetic polymers, or combination thereof, and/or suitable synthetic polymers including synthetic rubber, neoprene, nylon, polyvinyl chloride (PVC), polystyrene, polyethylene, polypropylene, polyacrylonitrile, PVB, silicone, elastomers, or combinations thereof. The composition protects against weather damage such as corrosion or decomposition or degradation of the counterweight and in some aspects attenuates noise generated from interaction between the counterweight and the flagpole.

Counterweight 122 also includes a flexible sheath 136 that extends over the counterweight along the majority or entirety of its length, for example, 50% to 100%, and more particularly, 90% to 100% of the length of the counterweight. In one aspect, the sheath is made of a fabric, and in particular, polyester, polypropylene, polyethylene, polyamide, hydrophobic cellulose, cotton, rayon, glass fiber or a suitable combination thereof. The sheath may be made from a polyamide mesh or may be made of a non-woven fabric generally, and in some instances the sheath may be made of a resilient material, woven or non-woven. The thickness of the fabric is about 0.01 inch to about 0.25 inch thick in one aspect and from about 0.1 inch to about 0.2 inch in another. The sheath mitigates against noise created between the counterweight and the flagpole and protects the counterweight from wear and corrosion.

Referring briefly to FIG. 3, an extension or secondary counterweight 138 may be connected to the second attachment means 132 and extend to the retainer ring assembly 128. Extension 138 in one aspect may be substantially the same as counterweight 122 and may include a sheath having the characteristics described above for sheath 136.

Referring further to FIG. 3, cover 140 may attached over one or both (as shown) of ends 124, 126 of counterweight 122 and is preferably slipped over the end and does not extend over attachment means 130, 132. Cover 140 has a closed convex end extending into an open cylindrical end that receives ends 124, 126 and may be removably or fixedly attached to an end.

In another aspect, it may be desirable to modify cover 140 to form a longitudinal slit (parallel to longitudinal axis 104) to extend over attachment means 130 and/or 132 to permit flag attachment means 134 to extend through the slit. Cover 140 may be a natural polymer or synthetic polymer such as synthetic rubber, neoprene, nylon, polyvinyl chloride (PVC), polystyrene, polyethylene, polypropylene, polyacrylonitrile, PVB, or silicone, or combinations thereof or similar material and is preferably a deformable or resilient material. For removable attachment, an elastomeric material would be preferable to provide a snug fit over the ends although a weak adhesive or removable fastener is used for contact between the sheath and the inner surface of the cover. For fixed attachment, the cover may be held in place with a stronger adhesive and/or permanent fastener.

In general, although preferred embodiments have been described herein, those skilled in the art will appreciate that substitutions and modifications may be made without departing from the scope and spirit of the appended claims.

What is claimed is:

1. An internal halyard flagpole assembly, comprising:

a halyard;

a retainer ring encircling a flagpole;

first and second self-closing fasteners for securing a flag, said first self-closing fastener positioned adjacent to said halyard and said second self-closing fastener positioned adjacent to said retainer ring for receiving and supporting respective top and bottom portions of the flag;

a counterweight extending from a first end coupled to said first self-closing fastener to a second end coupled to said second self-closing fastener, and having a weight evenly distributed from the first end coupled to the first self-closing fastener to the second end coupled to the second self-closing fastener;

a first fastener for coupling the first end of the counterweight to the first self-closing fastener and to the halyard; and a second fastener for coupling the second end of the counterweight to the second self-closing fastener and to the retainer ring.

2. The flagpole assembly of claim 1, wherein:

the counterweight comprises linked rigid segments.

3. The flagpole assembly of claim 1, wherein:

the weight of the counterweight is between 0.25 and 3 lbs per linear foot.

4. The flagpole assembly of claim 1, further comprising:

a sheath surrounding at least a portion of the counterweight.

5. The flagpole assembly of claim 4, wherein:

the sheath is selected from the group consisting of polyester, polypropylene, polyethylene, polyamide, cellulose, cotton, rayon, glass fiber, or a combination thereof.

6. The flagpole assembly of claim 4, wherein:

the sheath is a synthetic polymer consisting of synthetic rubber, neoprene, nylon, polyvinyl chloride (PVC), polystyrene, polyethylene, polypropylene, polyacrylonitrile, PVB, or silicone, or combinations thereof.

7. An internal halyard flagpole assembly, comprising:

a halyard operable to adjust said flagpole assembly;

a counterweight extending from a first end coupled to an external end of said halyard to a second end coupled to a retainer ring encircling a flagpole, said counterweight having a weight evenly distributed from the first end coupled to the external end of the halyard to the second end coupled to the retainer ring;

a first attachment means for coupling the first end of the counterweight to a first flag attachment means and to a secondary linkage having a rotatable swivel attached to said halyard external end; and a second attachment means for coupling the second end of the counterweight to a second flag attachment means and to the retainer ring, wherein said counterweight exerts a tension on said halyard, said tension sufficient to maintain operability of said halyard.

8. The flagpole assembly of claim 7, wherein:

at least one of said first or second attachment means is a closable carabiner-type linkage.

9. The flagpole assembly of claim 7, wherein:

at least one of said first or second flag attachment means is a self-closing fastener.

10. The flagpole assembly of claim 7, wherein:

the counterweight comprises linked rigid segments.

11. The flagpole assembly of claim 7, wherein:

the weight of the counterweight is between 0.25 and 3.0 lbs per linear foot.

12. An internal halyard flagpole assembly for supporting a flag on a flagpole, comprising:

a halyard;

a retainer ring encircling the flagpole;

a flag having a top edge and a bottom edge, the distance between the top edge and the bottom edge defining a flag height;

a first attachment means connected to the halyard, the first attachment means supporting the flag along the top edge of the flag;

a second attachment means connected to the retainer ring, the second attachment means supporting the flag along the bottom edge of the flag; and a counterweight extending from the first attachment means at the top edge of the flag to the second attachment means at the bottom edge of the flag thereby connecting the halyard to the retainer ring, the counterweight having a weight evenly distributed from the first attachment means to the second attachment means, thereby evenly distributing the weight along the flag height.

13. The flagpole assembly of claim 12, wherein at least one of the first or second attachment means is a closable carabiner-type linkage.

14. The flagpole assembly of claim 12, wherein said first or second attachment means is coupled to a self-closing fastener.

15. The flagpole assembly of claim 12, wherein the counterweight comprises linked rigid segments.

* * * * *